United States Patent [19]
Simon et al.

[11] Patent Number: 6,002,392
[45] Date of Patent: Dec. 14, 1999

[54] METHOD AND APPARATUS FOR DISPLAYING INFORMATION

[76] Inventors: John R. Simon, 608 White Oak La., Gladstone, Mo. 64116; Gary L. Thomas, 524 Oakbrook Dr., Lansing, Kans. 66043

[21] Appl. No.: 09/001,113

[22] Filed: Dec. 30, 1997

[51] Int. Cl.$^6$ ..................................................... G06F 3/00
[52] U.S. Cl. ............................................. 345/326; 705/43
[58] Field of Search ...................... 705/43; 345/326–358, 345/978

[56] References Cited

U.S. PATENT DOCUMENTS

| | | | |
|---|---|---|---|
| 5,237,157 | 8/1993 | Kaplan | 705/10 |
| 5,642,922 | 7/1997 | Ramachandran et al. | 235/379 |
| 5,650,604 | 7/1997 | Marcous et al. | 902/8 |
| 5,752,239 | 5/1998 | Couth | 705/26 |
| 5,761,071 | 6/1998 | Bernstein et al. | 364/479.77 |
| 5,821,933 | 10/1998 | Keller et al. | 345/348 |
| 7,970,992 | 7/1976 | Boothroyd et al. | 705/43 |

OTHER PUBLICATIONS

"Ultrada at a glance," Retail Delivery Systems News, Aug. 2, 1996, v. 1, No. 16.
"Racal–Datacom Excaliboror ISX 5010 Subrate Time–Division . . . ," News Release, (Mar. 28, 1994).
Hayes, M., "Faung The Millenium—The time is now for . . . ," informationweek, n 649, p. 258., 1997.

*Primary Examiner*—A. Katbab
*Attorney, Agent, or Firm*—Shook, Hardy & Bacon LLP

[57] ABSTRACT

A signage display apparatus 6 is provided for use on a kiosk or automated teller machine 8 for displaying information concerning a service offered by the provider of the drive-through or teller machine services. The apparatus includes a base 18, a pair of opposed, upstanding panels 20 that are sealed together along the side edges thereof, and an elongated hood 22 received over top edges of the panels. A gasket 32 is sandwiched between the hood and the top edges of the panels to seal them against the passage of moisture between the top edges of the panels. The base 18 is secured to the kiosk or teller machine 8 within the line of sight of users such that the apparatus displays information concerning a service offered by the service provider to anyone making a transaction. In addition, the method of the disclosure includes the additional steps of permitting the user to make a request for additional information concerning the service about which information is displayed, and providing the additional information to the user, either through the kiosk or automated teller machine, or as a follow-up to the user's request.

1 Claim, 1 Drawing Sheet

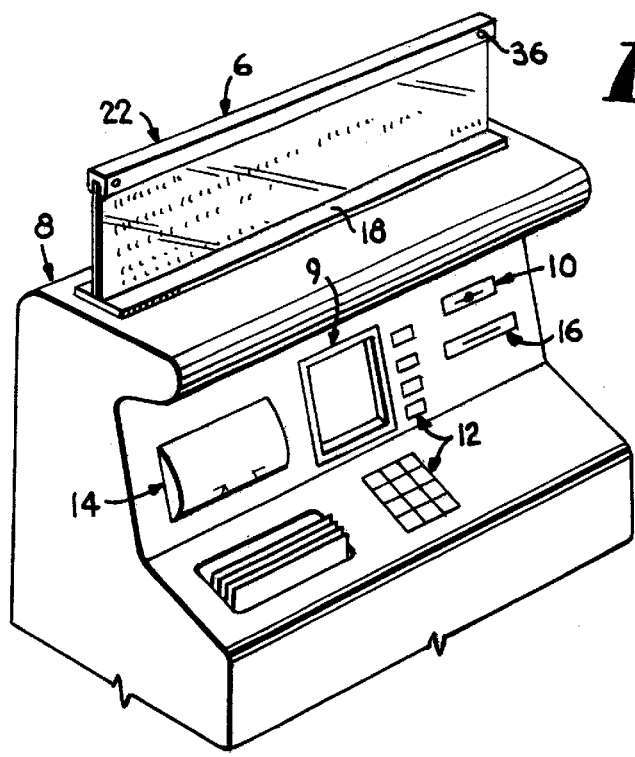
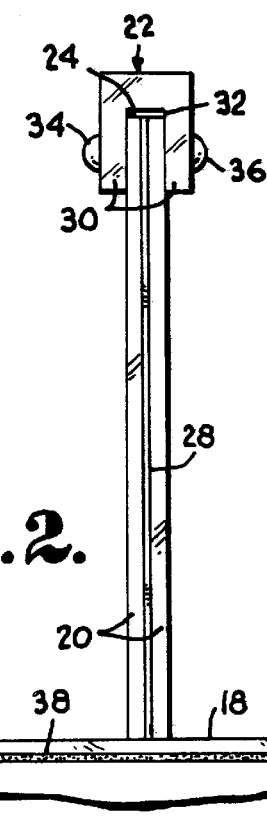
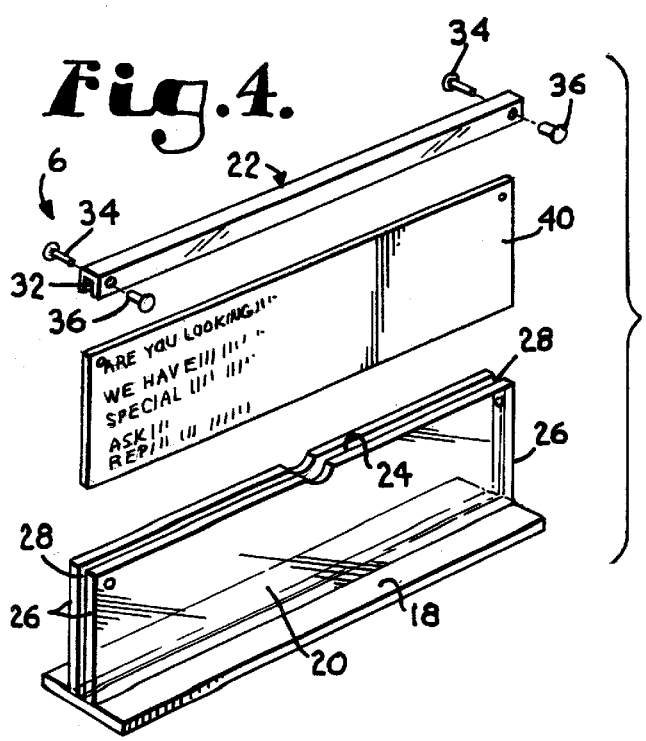
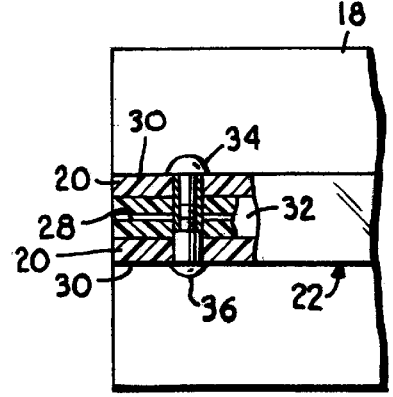

6,002,392

METHOD AND APPARATUS FOR DISPLAYING INFORMATION

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates generally to a signage display apparatus for use on a kiosk, an automated teller machine, or the like, and to a method of displaying and disseminating information in conjunction with such machines.

The use of drive-through kiosks by banks is becoming increasingly popular, accounting for a greater and greater percentage of the total business transactions performed by such institutions. Typically, several kiosks are constructed side-by-side next to a banking facility manned by one or more tellers so that customers can drive up to one of the kiosks and conduct a transaction. Each kiosk is typically provided with a microphone and speaker to enable the customer and teller to communicate with one another, as well as a pneumatic transfer assembly for allowing documents and money to be transferred to and from the kiosk by the teller.

A conventional automated teller machine includes a display screen or the like, a card reader input device, a printer, and at least one additional input device such as a keyboard, microphone, bar code reader or the like. Banks are common owners of automated teller machines, and use the machines to permit customers to access their accounts and conduct banking business at times convenient to the customer, and without requiring them to park their cars and walk into the bank to a teller window.

Typically, when a customer wants to use an automated teller machine at a bank, he or she first inserts a data-bearing card into the card reader input device of the machine, and enters a personal identification number or PIN into the keypad. Thereafter, the customer is empowered to input requests for any of the various services offered through the machine, such as making a deposit or withdrawal, or checking his or her account balance. Depending upon which request is made, a series of options are presented to the customer, and responses are made by inputting information into the keypad or microphone of the machine until the service is completed, whereupon the customer's card is returned.

Although it is common for banks to display information about their various services on signage or the like inside the lobby of the bank, no such vehicle is used to provide similar information to customers who use the drive-through or automated machines without entering the bank itself. For example, information concerning car loan or mortgage rates, or information concerning other various financial products is typically advertised on such signage, and brochures and other literature are made available at the teller windows for anyone requesting such additional information.

In light of the absence of a vehicle for presenting similar information to users of drive-through and automated teller machines, it would be advantageous to provide an apparatus and method for displaying such information and for disseminating such additional information to customers who express an interest in these advertised services.

BRIEF SUMMARY OF THE INVENTION

It is an object of the present invention to provide such an apparatus and method, whereby a customer of a bank or the like using a kiosk or automated teller machine can view information concerning a service offered by the bank and request additional information about the service in much the same way as is done by a walk-in customer who is able to simply request such information in person.

In accordance with these and other objects evident from the following description of a preferred embodiment of the invention, a signage display apparatus is provided for use on a kiosk or automated teller machine, wherein the apparatus includes an elongated base to which are secured a pair of opposed, upstanding panels that are spaced from one another and sealed together along the side edges thereof such that the space between the panels is sealed against the passage of moisture between the side edges. An elongated hood is received over the top edges of the panels, and a gasket is sandwiched between the hood and the top edges of the panels to seal the space therebetween against the passage of moisture. The base is secured to the kiosk or automated teller machine by an adhesive, fasteners, or the like, and is positioned within the line of sight of users of the machine to display information concerning services other than those offered directly through the machine.

By providing a display apparatus in accordance with the present invention, numerous advantages are realized. For example, by providing a display apparatus that is secured to a kiosk or automated teller machine within the line of sight of users thereof, it is possible to advertise various services of the bank other than the services already known to the customer. As such, additional information concerning these secondary services can be made available to users upon request, either by printing or dispensing such additional information, or by triggering a follow-up letter or call by the bank to the customer. This tying of the signage with a kiosk or automated teller machine enables the user to request additional information concerning the secondary services in much the same way as is possible with walk-in customers who see such services advertised on signage within the lobby of the bank.

The inventive method includes the steps of providing a signage display apparatus in the vicinity of a kiosk or automated teller machine to display information concerning a service other than the one already being provided to the user of the kiosk or machine, permitting the user to make a request for additional information concerning the second service beyond the information displayed, and providing the additional information to the user. Thus, the advantages noted above with respect to the display apparatus are realized through the inventive method.

BRIEF DESCRIPTION OF THE SEVERAL VIEWS OF THE DRAWING

The preferred embodiment of the present invention is described in detail below with reference to the attached drawing, wherein:

FIG. 1 is a perspective view of an automated teller machine and a signage display apparatus constructed in accordance with the preferred embodiment of the present invention;

FIG. 2 is a side elevational view of the signage display apparatus;

FIG. 3 is a fragmentary view of the apparatus, illustrating a fastener forming part of the apparatus; and FIG. 4 is an exploded perspective view of the apparatus.

DETAILED DESCRIPTION OF THE INVENTION

A conventional automated teller machine is illustrated in FIG. 1, wherein a signage display apparatus 6 constructed in accordance with the preferred embodiment is secured to the machine 8 for displaying information to a person using the machine. As is typical, the machine 8 includes a display screen 9 for displaying information to the user, a card reader input device 10 for reading magnetic information or the like off of a user's card, one or more keypad input devices 12 for allowing the user to input information in response to information displayed on the screen, a deposit and withdrawal drawer 14 for receiving and dispensing documents, and a printer 16 having an output slot for dispensing receipts and the like produced by the printer. In addition, a microphone and speaker may be provided for permitting the user to input and receive verbal information from the machine, and a camera may also be provided to receive visual information, if desired. Although the signage is shown in FIG. 1 on the machine 8, it can also be employed without modification on a drive-through kiosk. As such, any discussion of the signage as it relates to the machine 8 should be construed to apply equally to kiosks.

The signage display apparatus is shown in FIG. 4, and includes an elongated base 18, a pair of opposed, upstanding panels 20 secured to the base, and an elongated hood 22 received over the panels. The base 18 is formed from a sheet of any suitable synthetic resin material or the like, and is preferably transparent so as to present an unobtrusive appearance when the apparatus is secured on the machine 8. Other materials such as wood, metal or ceramics could also be used without departing from the scope of the invention.

The upstanding panels 20 are substantially identical to one another, and each is formed from a sheet of transparent material such as glass or a suitable synthetic resin which is substantially impervious to moisture. Each panel presents a bottom edge along which the panel is secured in a watertight manner to the base, an upper edge 24 opposite to and parallel with the bottom edge, and a pair of longitudinally opposed side edges 26. The panels 20 are arranged on the base in a spaced relationship such that an interior space is defined between the panels within which a substrate 40 bearing desirable signage can be received. A bead 28 of sealant material is applied between the panels 20 along the lengths of the side edges to seal the edges 26 together such that the interior space is sealed against the passage of moisture between the side edges.

As shown in FIG. 2, the elongated hood 22 is U-shaped in cross section, presenting a pair of depending front and rear lips 30 that extend over the panels to close off the interior space from moisture. Although the hood can be formed of any suitable material that is substantially impervious to moisture, it is preferably formed of the same material as the panels, and can be made transparent to present an unobtrusive appearance that does not detract from the signage displayed. A gasket 32 formed of an elastomeric material such as natural or synthetic rubber or the like is sandwiched between the hood and the top edges of the panels such that the space between the panels is sealed against the passage of moisture between the top edges of the panels. As such, the interior space of the apparatus is completely closed off from moisture when the hood is in place, protecting the substrate from being warped and ruined by rain and the like.

In order to enable the hood to be secured in place on the apparatus, the panels and hood all have holes therein, as shown in FIG. 4, which are aligned with one another when the hood is in place so that a suitable fastener can be inserted in the holes to retain the hood over the interior space. Preferably, two fasteners are employed, wherein each fastener includes an externally threaded element 34 and an internally threaded element 36 which mate with one another to secure the hood to the panels. However, any other type of suitable fastener or securing mechanism can be employed without departing from the scope of the invention.

A means is provided for securing the base to the automated teller machine so that it cannot be removed or easily vandalized, and so that the signage is always oriented in the line of sight of an individual using the automated teller machine. The securing means preferably includes an adhesive 38 that is applied between the base and the machine for securing the base in position. However, threaded fasteners or the like can alternately be employed, as could any other type of fastening or securing expedient known to those of ordinary skill in the art.

With reference to FIG. 1, a method employing the signage display apparatus 6 includes mounting the apparatus to an automated teller machine 8 that provides at least a first service or set of services of a service provider. The method of use also includes the steps of displaying information in the apparatus that concerns a second service or set of services offered by the service provider to anyone using the machine, permitting the user to input a request for additional information concerning the second service beyond the information displayed, and providing such additional information to the user.

Typically, a customer approaches teller machine 8, and inserts his or her identification card which bears a strip of magnetic material on which is stored information such as the customer's account number. The machine reads the information on the card, and verifies that the PIN entered by the customer corresponds to the correct one. If so, the customer is permitted to enter any of various options by operating the keypad 12 or other input device and following the instructions appearing on the screen of the machine.

The display apparatus 6 is secured to the machine 8 within the line of sight of the customer at the machine such that the customer is able to view certain information about a service or set of services other than those offered through the machine. If the customer is interested, he or she can indicate this interest by entering a request for additional information at the appropriate time during operation of the teller machine. For example, at the end of each transaction conducted by the machine, a display can be produced on the screen 9 asking the customer is interested in receiving additional information about the services advertised in the display apparatus. If the customer is interested, he or she would simply enter a "yes", and the additional information would be provided.

Several options exist for getting the additional information to the customer, including either printing or dispensing the information directly through the automated teller machine 8, or following up the customer's automated request with a mailing or telephone call. Regardless of the method used, the method makes it possible for the service provider to advertise services in much the same way as is typical for walk-in traffic, but with the added benefit of allowing the customer to make an automated request for additional information.

Another option in practicing the invention includes performing additional processing of the customer's request before providing the additional information. For example, because the service provider already has the personal information for the user making the request, it is possible to conduct preliminary analysis of the request to determine if the customer is qualified for the particular service displayed, and can customize the additional information to suit the particular situation of the customer. As such, information provided in response to requests by customers may differ from customer to customer depending on who is making the request.

In addition, it is possible to keep track of who is making requests such that the service provider can analyze the response to certain displays and services in order to plan future service offerings. This benefit results from being able to tie each request to a customer about which the service provider already knows something.

Another option of the preferred method includes customizing the display on the screen of the automated teller machine to supplement the information presented in the display apparatus 6 such that some information is presented by both the machine 8 and the display apparatus, improving the chances that the customer will notice and read the information.

Although the invention has been described with reference to the preferred embodiment illustrated in the attached drawing figures, it is noted that substitutions may be made and equivalents employed herein without departing from the scope of the invention as recited in the claims. For example, although the display apparatus is illustrated as being secured to the automated teller machine, it is noted that the apparatus could instead be built into the teller machine in such a way that the signage can be replaced periodically in the same manner as the preferred construction. The advantage of the particular apparatus shown and described is that it can be retrofitted on existing teller machines whereas a built-in apparatus would require the manufacture of a new teller machine. In addition, the size and location of the apparatus on the machine can be changed without altering the evident purposes of the invention.

We claim:

1. A method of displaying information in conjunction with a drive-through kiosk at which a first service is offered by a service provider, the kiosk including a transfer assembly for transferring materials between the customer and the service provider, a speaker, and a microphone, the method comprising the steps of:

providing a signage display apparatus within the line of sight of the customer during use of the kiosk for displaying a sign including information concerning a second service offered by the service provider, the signage display apparatus protecting the sign from moisture;

permitting the user to make an oral request for additional information concerning the second service beyond the information displayed by using the microphone of the kiosk; and providing the additional information to the user using the transfer assembly.

* * * * *